United States Patent [19]

Kawasaki et al.

[11] 4,096,494

[45] Jun. 20, 1978

[54] SHUTTER SPEED INDICATOR DEVICE

[75] Inventors: Masahiro Kawasaki, Tokyo; Eiichi Tano, Asaka, both of Japan

[73] Assignee: Asahi Kogaku Kogyo Kabushiki Kaisha, Tokyo, Japan

[21] Appl. No.: 682,868

[22] Filed: May 3, 1976

[30] Foreign Application Priority Data

May 2, 1975 Japan .................................. 50-53984

[51] Int. Cl.² .............................................. G03B 17/20

[52] U.S. Cl. .................................. 354/53; 354/23 D; 354/60 L

[58] Field of Search ...................... 354/23 D, 53, 60 L

[56] References Cited

U.S. PATENT DOCUMENTS 3,818,495 6/1974 Sagara et al. .......................... 354/53

3,971,048 7/1976 Ito et al. ............................. 354/60 L

OTHER PUBLICATIONS

SN74LS139 Spec. Sheet, TTL Data Book, Texas Instruments Corp., pp. 7-134 to 7-137, Dec. 1972.

*Primary Examiner*—Russell E. Adams

*Attorney, Agent, or Firm*—Sughrue, Rothwell, Mion, Zinn and Macpeak

[57] ABSTRACT

In a camera, a numerical indication of the shutter speed is displayed thru the viewfinder. Numerals corresponding to the several shutter speeds are arranged to be illuminated, and therefore visible, by light emitting diodes associated therewith. The array of light emitting diodes have their cathode and anode terminals coupled together in groups arranged to reduce the total number of external connections to the diode array. The shutter speed is converted to a digital value which is applied to a decoder. The decoder energizes the external terminals of the diode array to selectively energize only one diode, corresponding to the shutter speed.

2 Claims, 5 Drawing Figures

FIG 5

| R | S | T | U | $V_1$ | $V_2$ | $V_3$ | $V_4$ | $W_1$ | $W_2$ | $W_3$ | $W_4$ | * |
|---|---|---|---|---|---|---|---|---|---|---|---|---|
| 0 | 0 | 0 | 0 | 1 | 0 | 0 | 0 | 0 | 1 | 1 | 1 | L16 |
| 0 | 0 | 0 | 1 | 1 | 0 | 0 | 0 | 1 | 0 | 1 | 1 | L15 |
| 0 | 0 | 1 | 0 | 1 | 0 | 0 | 0 | 1 | 1 | 0 | 1 | L14 |
| 0 | 0 | 1 | 1 | 1 | 0 | 0 | 0 | 1 | 1 | 1 | 0 | L13 |
| 0 | 1 | 0 | 0 | 0 | 1 | 0 | 0 | 0 | 1 | 1 | 1 | L12 |
| 0 | 1 | 0 | 1 | 0 | 1 | 0 | 0 | 1 | 0 | 1 | 1 | L11 |
| 0 | 1 | 1 | 0 | 0 | 1 | 0 | 0 | 1 | 1 | 0 | 1 | L10 |
| 0 | 1 | 1 | 1 | 0 | 1 | 0 | 0 | 1 | 1 | 1 | 0 | L 9 |
| 1 | 0 | 0 | 0 | 0 | 0 | 1 | 0 | 0 | 1 | 1 | 1 | L 8 |
| 1 | 0 | 0 | 1 | 0 | 0 | 1 | 0 | 1 | 0 | 1 | 1 | L 7 |
| 1 | 0 | 1 | 0 | 0 | 0 | 1 | 0 | 1 | 1 | 0 | 1 | L6 |
| 1 | 0 | 1 | 1 | 0 | 0 | 1 | 0 | 1 | 1 | 1 | 0 | L 5 |
| 1 | 1 | 0 | 0 | 0 | 0 | 0 | 1 | 0 | 1 | 1 | 1 | L4 |
| 1 | 1 | 0 | 1 | 0 | 0 | 0 | 1 | 1 | 0 | 1 | 1 | L3 |
| 1 | 1 | 1 | 0 | 0 | 0 | 0 | 1 | 1 | 1 | 0 | 1 | L2 |
| 1 | 1 | 1 | 1 | 0 | 0 | 0 | 1 | 1 | 1 | 1 | 0 | L1 |

* THE LIGHT EMITTING DIODE

SHUTTER SPEED INDICATOR DEVICE

BACKGROUND OF THE INVENTION

This invention relates to a shutter speed indicator device for photographic cameras wherein light emitting diodes are employed to indicate the shutter speed in a view finder. In cameras with conventional automatic exposure control systems, the time of exposure has heretofore been indicated by means of a photometer provided with an indicating pointer. However, the indication of the time of exposure by means of such a conventional photometer is disadvantageous because of its low mechanical strength and slow response speed. Also such photometers are not very easy to read. In order to eliminate the inconvenience and disadvantages of the above-mentioned conventional photometer, devices have been proposed which can indicate the shutter speed clearly by rendering the numerals representative of the time of exposure provided in a finder clearly visible by means of light emitting elements.

FIG. 1 shows a shutter speed indicator device employing light emitting diodes, and FIG. 2 is a connection diagram of conventional light emitting diodes. In FIG. 1, reference numeral 1 denotes a finder, and reference numeral 2 denotes numerals representative of the time of exposure. A plurality of light emitting diodes $L_1$, $L_2 \ldots L_{16}$ are located corresponding to the exposure numerals.

In FIG. 2, the reference characters $L_1$, $L_2 \ldots L_{16}$ denote light emitting diodes. The anodes of the light emitting diodes are connected in common to terminal A. The cathode terminals of the light emitting diodes $L_1$, $L_2 \ldots L_{16}$ are denoted by reference characters B, C . . . Q, respectively. If a positive voltage is applied to the anode terminal A and a negative voltage is applied to the cathode terminal G, then the light emitting diode $L_6$ is lighted to indicate a shutter speed of 1/60 second. However, the arrangement as shown in FIG. 2 is disadvantageous in that a great many light emitting diode terminals are required. Thus, the number of pins in the circuit to drive the light emitting diodes is high thereby increasing the cost and reducing the reliability thereof.

SUMMARY OF THE INVENTION

The present invention is intended to eliminate the above-mentioned disadvantage, and has for its object a reduction of the number pins in the circuit to drive the light emitting diodes.

In accordance with the present invention, the anodes of the diodes of the LED array are connected in groups wherein each anode group has one external connecting terminal or pin. Also the cathode terminals are connected in groups wherein each group has one external connecting terminal or pin. The groups are selected so that any combination of one anode group and one cathode group will have only one LED in common. The photometric generated voltage corresponding to exposure time is converted to a digital value which is applied to a decoder. The decoder selectively energizes the anode group terminals and the cathode group terminals so that only one LED, corresponding to the exposure time, is illuminated.

BRIEF DESCRIPTION OF THE DRAWINGS

FIG. 5 is a function table for explaining the operation of the circuit shown in FIG. 4.

DETAILED DESCRIPTION OF THE DRAWINGS

Figure 3:
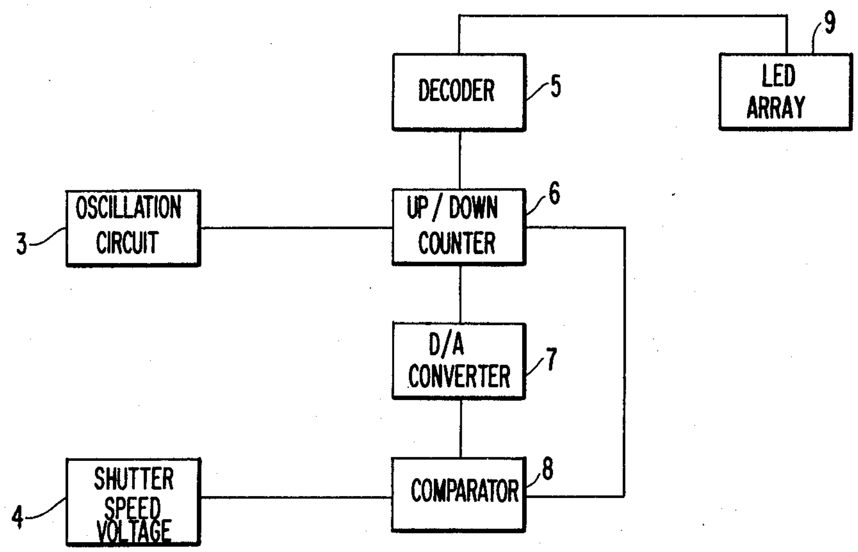
FIG. 3 is a block diagram of a digital indicator circuit applicable to the present invention.

FIG. 3 shows one embodiment of the present invention. In FIG. 3, reference numeral 3 denotes an oscillation circuit, the output of which is sent to an up-down counter 6 having four bits. Reference numeral 4 represents a voltage generator circuit for producing a voltage corresponding to the time of exposure, and the output of which is sent to a comparator 8 together with the output of a digital-analog convertor 7. The output of the comparator 8 is sent to the up-down counter 6 to control the direction of counting. Reference numeral 5 denotes a decoder, and 9 a light emitting diode array.

The operation of the above-mentioned arrangement will be given below.

The output of the oscillation circuit is sent to the up-down counter 6 as an input, and the content of the counter 6 is converted into an analog voltage $V_7$ by the action of the digital-analog convertor 7. In comparing the analog voltage $V_7$ with the output voltage $V_4$ of the voltage generator circuit 4, if $V_7$ is higher than $V_4$, the output of the comparator 8 serves to actuate the up-down counter 6 to cause it to count down, for down-count, and if $V_7$ is lower than $V_4$, the counter 6 is actuated to cause it to count up. The above-mentioned arrangement operates to keep $V_7$ equal to $V_4$, and the content of the up-down counter 6 becomes a digital quantity corresponding to the time of exposure. The content of the up-down counter 6 is sent through the decoder 5 to the light emitting diode array 9 thereby causing the latter to be lighted. The details of the oscillation circuit 3, the circuit 4 for generating a voltage corresponding to the time of exposure, the up-down counter 6 having four bits, the digital-analog convertor 7 and the comparator 8 are well known, and therefore the detailed explanation thereof is omitted herein.

Figure 1:
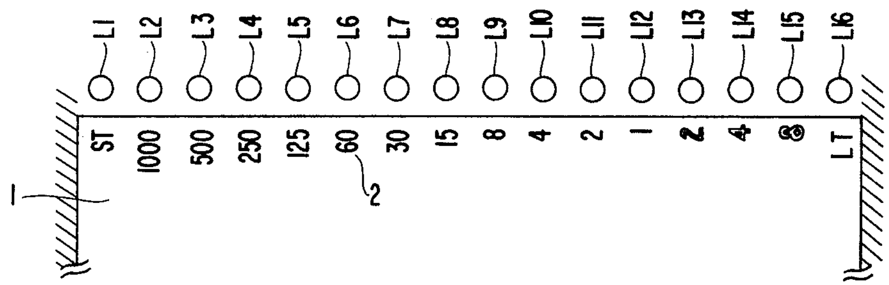
FIG. 1 illustrates the relationship of time exposure indicating numerals in a camera view finder to light emitting diodes provided to illuminate the numerals. The arrangement is applicable to the prior art as well as to the present invention.
Figure 4:
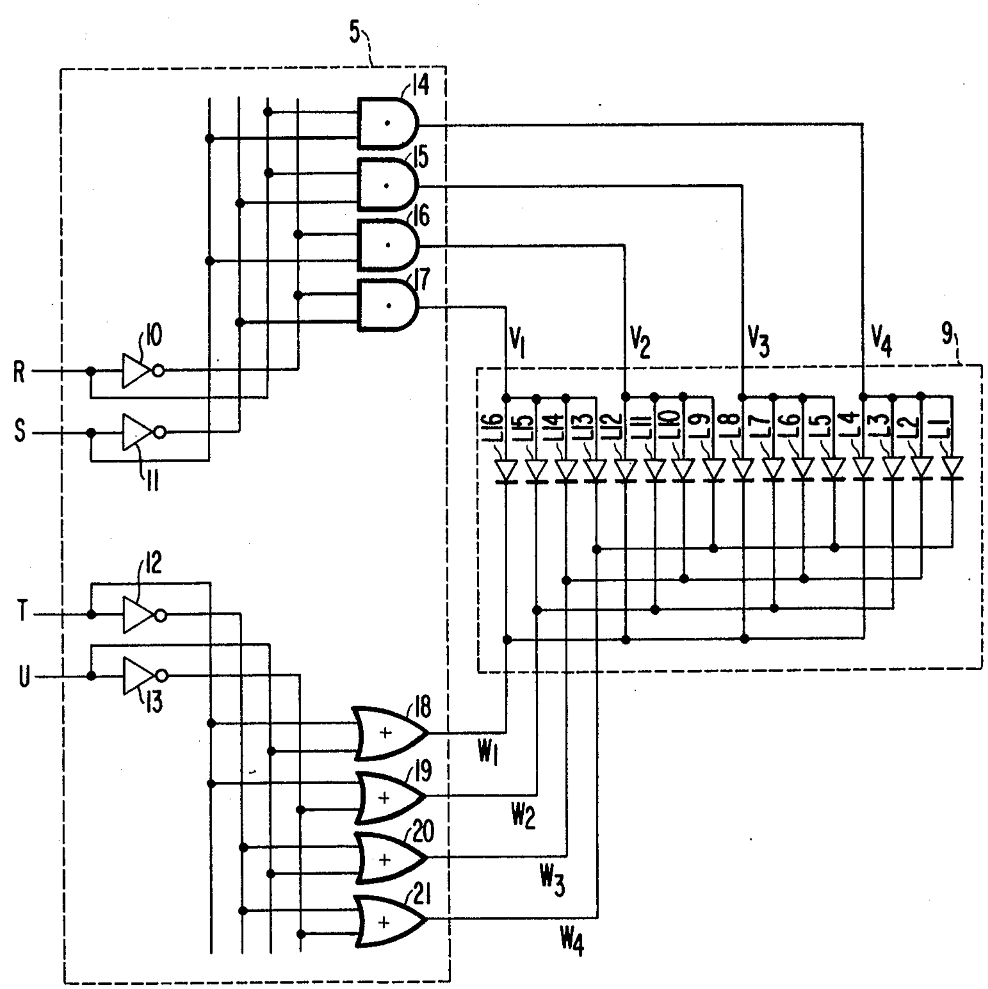
FIG. 4 is a circuit diagram of one embodiment of the present invention.

The decoder 5 and the light emitting diode array 9 will now be described in detail with reference to FIG. 4. Reference numerals 10, 11, 12 and 13 denote NOT or INVERT circuits, 14, 15, 16 and 17 denote AND circuits, and 18, 19, 20 and 21 denote OR circuits. Light emitting diodes $L_1$, $L_2 \ldots L_{16}$ are located corresponding to the arrangement shown in FIG. 1. The anodes of the diodes $L_1$ to $L_4$, the anodes of the diodes $L_5$ to $L_8$, the anodes of the diodes $L_9$ to $L_{12}$, and the anodes of the diodes $L_{13}$ to $L_{16}$ are commonly or jointly connected, respectively. The cathodes of the diodes $L_1$, $L_5$, $L_9$ and $L_{13}$, the cathodes of the diodes $L_2$, $L_6$, $L_{10}$ and $L_{14}$, the cathodes of the diodes $L_3$, $L_7$, $L_{11}$ and $L_{15}$, and the cathodes of the diodes $L_4$, $L_8$, $L_{12}$ and $L_{16}$ are jointly connected, respectively. The anodes of the groups are connected with the AND circuits 14, 15, 16 and 17, respectively, and the cathodes of the groups are connected with the OR circuits 21, 20, 19 and 18.

The terminals R, S, T and U represent the four-bit output from the up-down counter 6. The decoder 5 receives the four bit output and provides outputs $V_1$ - $V_4$ to the anode groups and $W_1$ - $W_4$ to the cathode groups. The relation between the bit values at R, S, T and U, and those at $V_1$ - $V_4$ and $W_1$ - $W_4$ are shown in FIG. 5. Also the particular LED which is energized to illumination is indicated in the column farthest to the right.

As shown in the function table of FIG. 5, if the bit outputs R, S, T and U of the up-down counter 6 are, for example, 1010, the outputs $V_1$, $V_2$, $V_3$ and $V_4$ of the AND circuits 14, 15, 16 and 17 will be 0010, and the outputs $W_1$, $W_2$, $W_3$ and $W_4$ of the OR circuits 18, 19, 20 and 21 will be 1101. Under this condition, $V_3$ is 1 and $W_3$ is 0, so that only the light emitting diode $L_6$ is lighted. In the example shown, a "1" bit represents a voltage level more positive than that represented by a "0" bit. The logic of the decoder 5 is arranged so that no matter what the value of the 4-bit input, there will be only one V terminal carrying a "1" bit and there will be only one W terminal carrying a "0" bit.

Figure 2:
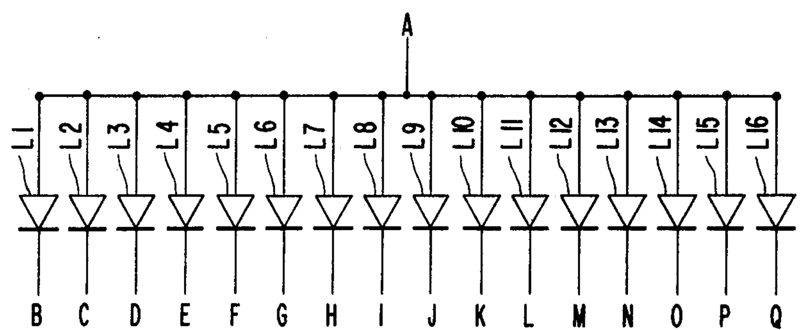
FIG. 2 is a schematic diagram of the connection of the light emitting diodes to connection terminals adapted to receive voltages for determining the conducting states of the diodes, as known in the prior art.

In view of the foregoing, according to the present invention, the anodes of the light emitting diodes are divided into several groups (four groups in the embodiment shown in FIG. 4), and the cathodes of each group of diodes are jointly connected in a suitable manner so that the number of output terminals of the decoder 5 can be substantially reduced. For the circuit of FIG. 2, sixteen output terminals are provided, whereas in FIG. 4, showing one embodiment of the present invention, the number of the output terminals is only eight. Therefore, according to the present invention, the number of electric wires connected with the light emitting diodes can be reduced, and if constructed as an integrated circuit, which is most likely, the number of pins required is reduced thereby decreasing the cost and improving the reliability of the circuit.

What is claimed is:

1. In a shutter speed indicator for a camera, said shutter speed indicator being of the type having an array of light emitting elements for illuminating a plurality of shutter speed indicating numerals, respectively, to cause the illuminated numeral to be visible through the camera view finder, the improvement comprising; each said light emitting element having an anode and a cathode, the anodes of said array of elements being grouped into a plurality of groups, each anode being in only one anode group, and the anodes in each group being connected together to form an anode external terminal, the cathodes of said array of elements being grouped into an equal plurality of groups to form an equal plurality of cathode external terminals, the group connections are arranged so that the combination of any one anode external terminal and any one cathode external terminal has in common only a single light emitting element, and energizing means for providing a unique multibit digital signal responsive to a shutter speed value, each unique multibit digital signal causing energization of a corresponding unique pair of said anode and cathode external terminals, thereby only the light emitting element common to said energized terminals is illuminated and the corresponding shutter speed indicating numeral becomes visible.

2. A shutter speed indicator as claimed in claim 1 wherein said energizing means comprises, means for developing a digital value corresponding to said shutter speed, and decoder means responsive to said digital value for selectively energizing said anode and cathode external terminals, wherein said decoder comprises, a bank of AND gates having their outputs connected respectively to said anode external terminals, a bank of OR gates having their outputs connected respectively to said cathode external terminals, a first group of INVERT gates connected to receive the low order bits of said digital value, said low order bits and the outputs of said first group of INVERT gates being connected as inputs to said OR gates, a second group of INVERT gates connected to receive the high order bits of said digital value, said high order bits and the outputs of said second group of INVERT gates being connected as inputs to said AND gates.

* * * * *